United States Patent
Leclercq et al.

(10) Patent No.: US 9,415,863 B2
(45) Date of Patent: Aug. 16, 2016

(54) FIBER REINFORCEMENT FOR MAKING AN ELONGATE MECHANICAL PART OUT OF COMPOSITE MATERIAL

(71) Applicants: SNECMA, Paris (FR); MESSIER-BUGATTI-DOWTY, Velizy Villacoublay (FR); SAFRAN, Paris (FR)

(72) Inventors: Sylvain Leclercq, Cachan (FR); Bruno Jacques Gerard Dambrine, Le Chatelet en Brie (FR); Dominique Marie Christian Coupe, Le Haillan (FR)

(73) Assignees: SNECMA, Paris (FR); MESSIER-BUGATTI-DOWTY, Velizy Villacoublay (FR); SAFRAN, Paris (FR)

( * ) Notice: Subject to any disclaimer, the term of this patent is extended or adjusted under 35 U.S.C. 154(b) by 5 days.

(21) Appl. No.: 14/628,665

(22) Filed: Feb. 23, 2015

(65) Prior Publication Data

US 2015/0239553 A1    Aug. 27, 2015

(30) Foreign Application Priority Data

Feb. 25, 2014    (FR) ...................................... 14 51489

(51) Int. Cl.
  *B64C 25/14*    (2006.01)
  *B64C 25/10*    (2006.01)
  (Continued)

(52) U.S. Cl.
  CPC ............. *B64C 25/10* (2013.01); *B29C 70/222* (2013.01); *B29C 70/24* (2013.01); *B29C 70/48* (2013.01);
  (Continued)

(58) Field of Classification Search
  CPC ............ B32B 5/12; B32B 5/024; B32B 5/22; B32B 5/26; B32B 2250/20; B32B 2260/023; B32B 2250/03

USPC ..... 244/102 R, 102 A, 102 SL; 442/239–267, 442/182–184; 428/34.1–36.92
  See application file for complete search history.

(56) References Cited

U.S. PATENT DOCUMENTS

| | | | |
|---|---|---|---|
| 7,926,761 B2 * | 4/2011 | Coupe ..................... | B29C 70/24 244/102 A |
| 2007/0007386 A1 | 1/2007 | Coupe et al. | |

(Continued)

FOREIGN PATENT DOCUMENTS

| | | |
|---|---|---|
| CH | 652 176 A5 | 10/1985 |
| EP | 1 308 265 A1 | 5/2003 |

(Continued)

OTHER PUBLICATIONS

French Preliminary Search Report issued Oct. 30, 2014, in Patent Application No. FR 1451489, filed Feb. 25, 2014 (with English Translation of Category of Cited Documents).

*Primary Examiner* — Timothy D Collins
*Assistant Examiner* — Richard G Davis
(74) *Attorney, Agent, or Firm* — Oblon, McClelland, Maier & Neustadt, L.L.P.

(57) ABSTRACT

The invention relates to fiber reinforcement for making an elongate mechanical part (10) out of composite material having a lug (14) at at least one end for receiving a pin for making a pivot connection with another part, the fiber reinforcement being made from a central fiber structure (106; 106') for forming a core that is obtained by three-dimensional weaving, from a peripheral fiber structure (16; 16') that is to form a belt surrounding the central structure so as to form at least one empty cylindrical space in the lug of the part, and from at least one annular fiber structure (112; 112'; 112") that is to form a ring that is formed inside the empty space provided between the central structure and the peripheral structure.

5 Claims, 4 Drawing Sheets

(51) Int. Cl.
  *B32B 5/02*   (2006.01)
  *B32B 5/22*   (2006.01)
  *B29C 70/48*  (2006.01)
  *B29C 70/22*  (2006.01)
  *B29C 70/24*  (2006.01)
  *F16C 7/02*   (2006.01)
  *B29L 31/30*  (2006.01)

(52) U.S. Cl.
  CPC . *B32B 5/024* (2013.01); *B32B 5/22* (2013.01); *F16C 7/026* (2013.01); *B29L 2031/3076* (2013.01); *B32B 2250/03* (2013.01); *B32B 2250/20* (2013.01); *B32B 2605/18* (2013.01); *Y10T 442/3528* (2015.04)

(56) References Cited

U.S. PATENT DOCUMENTS

| | | | |
|---|---|---|---|
| 2007/0152105 A1* | 7/2007 | Filsinger | B29C 70/222 244/213 |
| 2009/0317636 A1 | 12/2009 | Filsinger et al. | |
| 2010/0144227 A1 | 6/2010 | Coupe et al. | |
| 2013/0295302 A1* | 11/2013 | Godon | D03D 3/00 428/34.1 |
| 2014/0225297 A1* | 8/2014 | Richard | B29B 11/16 264/152 |

FOREIGN PATENT DOCUMENTS

EP    1 736 674 A1    12/2006
EP    1 798 428 A1    6/2007

\* cited by examiner

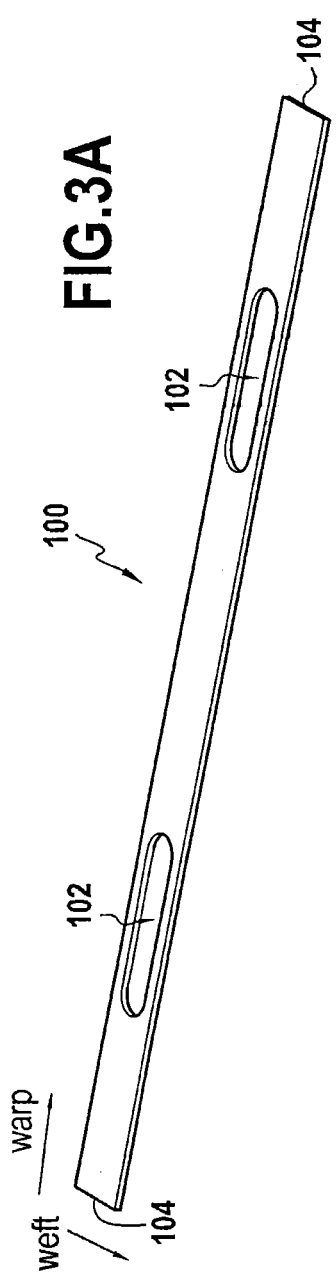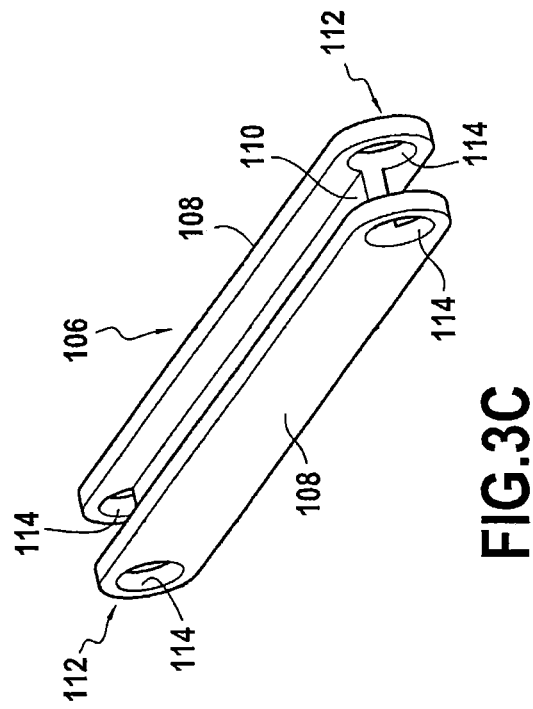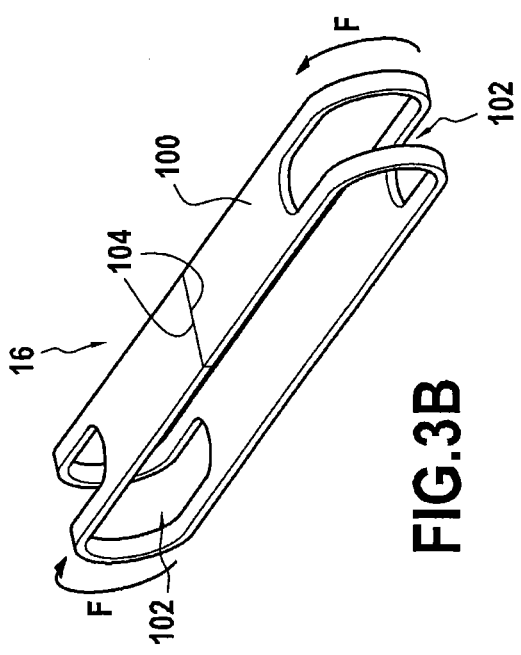

FIBER REINFORCEMENT FOR MAKING AN ELONGATE MECHANICAL PART OUT OF COMPOSITE MATERIAL

BACKGROUND OF THE INVENTION

The present invention relates to the general field of making an elongate mechanical part out of composite material, such a part having a lug at at least one of its ends for receiving a pin to provide a pivot connection with another part, and being stressed in operation both in traction and in compression.

A nonlimiting example of an application of the invention lies in making side-braces for landing gear.

A landing gear side-brace serves to take up lateral forces exerted on the landing gear and to keep it deployed after making contact with the ground. Typically, a side-brace comprises two arms that are hinged to each other and to other parts of the landing gear via their ends, by pivot connections.

In operation, such a mechanical part is subjected to high levels of mechanical force, mainly in compression and in traction, which forces are oriented along the longitudinal axis of the part (i.e. the axis passing through both ends of the part). Such parts are generally made out of alloys of steel, aluminum, or titanium.

In order to reduce the weight of such mechanical parts, proposals have been made to make them out of composite material. However, making such parts out of composite material raises various problems. In particular, given the limitations of composite materials concerning their ability to withstand hammering, the lugs of such parts are generally over-dimensioned, giving rise to the metal parts constituting interfaces with other parts of the landing gear also being over-dimensioned. Furthermore, such parts made of composite material present poor impact strength and a high risk of delamination, i.e. of their fiber layers separating, as a result of the repeated forces to which the part is subjected. Finally, the costs of fabricating such parts are high.

In order to satisfy these requirements, document EP 1 736 674 proposes making such mechanical parts out of composite material from a central fiber preform and a peripheral fiber preform, which preforms are obtained by three-dimensional weaving, the peripheral preform surrounding the central preform in such a manner as to leave at least one empty space at each of the two ends of the part between the two preforms, which spaces are for use in hinging with other parts. Metal inserts are housed in those spaces. That mechanical part thus presents an improvement in terms of hammering for traction forces on the lug.

OBJECT AND SUMMARY OF THE INVENTION

The present invention seeks to propose a mechanical part made of composite material serving firstly to obtain likewise an improvement in terms of ability to withstand hammering of the lug, both for compression forces and for traction forces, and secondly to offset the material discontinuity away from a highly-stressed zone.

In accordance with the invention, this object is achieved by fiber reinforcement for making an elongate mechanical part out of composite material having a lug at at least one end for receiving a pin for making a pivot connection with another part, the fiber reinforcement being made from a central fiber structure for forming a core that is obtained by three-dimensional weaving, from a peripheral fiber structure that is to form a belt surrounding the central structure so as to form at least one empty cylindrical space in the lug of the part, and from at least one annular fiber structure that is to form a ring that is formed inside the empty space provided between the central structure and the peripheral structure.

The fiber reinforcement of the invention is remarkable in that the presence of a ring of composite material that is received in the empty space arranged between the central structure and the peripheral structure serves effectively to counter failure as a result of hammering on the lug, in particular for compression forces and also for traction forces. This leads to a saving in weight for the part, and makes it possible to avoid over-dimensioning the interface parts, while also making it easier to integrate the part since it is more compact.

In an embodiment, the annular structure is integral with the central structure.

In another embodiment, the annular structure is integral with the peripheral structure. Under such circumstances, the peripheral structure and the annular structure may be obtained by three-dimensionally weaving a fiber blank as a single piece with a main portion in the form of a strip that extends in a direction corresponding to the longitudinal direction of the core to be fabricated, and two secondary portions, each connected to the main portion by a zone of non-interlinking in order to form two longitudinal tongues for folding towards each other in order to form a ring.

The two tongues of the fiber blank may each present a portion that is truncated in the longitudinal direction so as to enable the tongues to overlap when they are folded towards each other.

Furthermore, the fiber blank of the peripheral structure and of the annular structure may comprise a plurality of layers of warp yarns extending in the length direction of the strip and of the tongues and interlinked with one another by weft yarns.

In yet another embodiment, the annular structure forms a structure that is distinct from the central structure and from the peripheral structure. Under such circumstances, the annular structure may be obtained by three-dimensionally weaving a fiber blank in the form of a strip that is for rolling up to form a ring. Alternatively, the annular structure may be obtained by braiding.

The invention also provides an elongate mechanical part made of composite material including fiber reinforcement. The mechanical part may constitute a lever of a side-brace for landing gear.

BRIEF DESCRIPTION OF THE DRAWINGS

Other characteristics and advantages of the present invention appear from the following description made with reference to the accompanying drawings, which show implementations having no limiting character. In the figures:

FIGS. 3A to 3C show different steps in obtaining the FIG. 2 mechanical part in an embodiment of the invention;

DETAILED DESCRIPTION OF THE INVENTION

The invention applies to making an elongate mechanical part out of composite material having at least one lug at at least one end of the part for the purpose of receiving a pin in order to make a pivot connection with another part.

Figure 1:
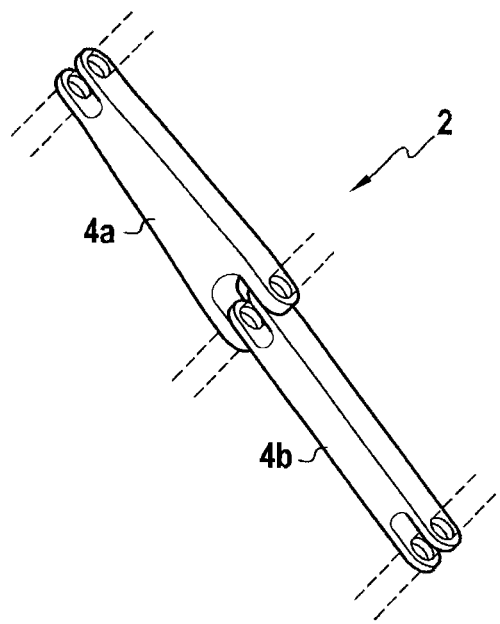
FIG. 1 is a diagrammatic perspective view of an example landing gear side-brace.

A nonlimiting example application is that of making a side-brace for landing gear of the kind shown in FIG. 1. Typically, such a side-brace 2, which serves to take up lateral forces exerted on the landing gear and to hold it in a deployed configuration, comprises a top lever 4a and a bottom lever 4b, each in the form of an elongate mechanical part. These levers 4a and 4b are hinged to each other and to other parts of the landing gear via their respective ends, by means of hinge pins represented by dashed lines in FIG. 1.

Figure 2:
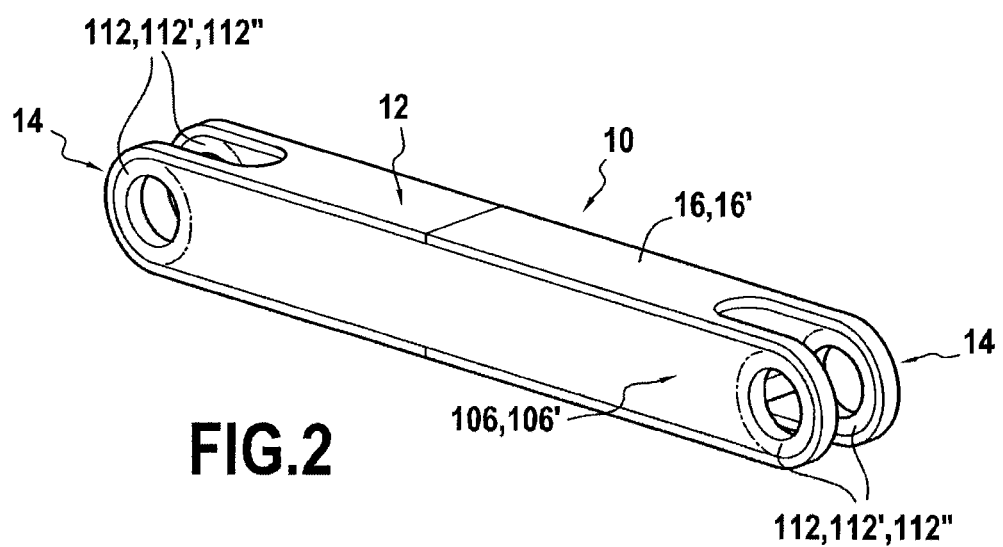
FIG. 2 shows an example of a mechanical part in accordance with the invention.

FIG. 2 shows an example of a mechanical part 10 suitable for acting as a bottom lever or a top lever of a side-brace such as that shown in FIG. 1.

The part 10 comprises an elongate body 12 that is terminated at each longitudinal end by a pair of lugs or "clevis" 14 for receiving a pin for making a pivot connection with another part. Each of these clevises 14 is in the form of a U-shape in which each branch constitutes a lug including an orifice for passing a pin for the pivot connection.

Naturally, in other application examples that are not shown, the part could have single lugs at each of its ends, or it could have a pair of lugs at one end and a single lug at the other end, or indeed it could have a single lug or a pair of lugs at only one of its ends, etc.

This part is made entirely out of composite material from fiber reinforcement that is densified by a matrix. The fiber reinforcement is made from a plurality of fiber structures, in particular it is made of carbon fibers, which structures are described below.

Once put into shape and dried, these fiber structures are placed in an injection mold. The matrix is deposited in a fiber structure while holding the structure in the mold, at least until the structure has stiffened (or consolidated). The nature of the matrix is selected as a function of the intended application, for example an organic matrix obtained in particular from a polymer matrix precursor resin such as an epoxy resin, bismaleimide resin, or a polyimide resin, or a carbon matrix, or a ceramic matrix.

With an organic matrix, the fiber structures are impregnated by a composition containing the matrix precursor resin, before or after shaping in tooling, and when impregnation is performed after shaping it may for example be performed by infusion or by a process of the resin transfer molding (RTM) type.

When the matrix is made of carbon or of ceramic, densification may be made by chemical vapor infiltration (CVI) or by impregnation with a liquid composition containing a carbon or ceramic precursor resin followed by heat treatment for pyrolysis or for ceramization of the precursor, which methods are themselves well-known.

In accordance with the invention, the fiber reinforcement that is to form the part 10, after being densified by a matrix, is made from a central fiber structure obtained by three-dimensional weaving in order to form the core of the part, a peripheral fiber structure obtained by three-dimensional weaving in order to form a belt for surrounding the core in such a manner as to provide an empty cylindrical space corresponding to each lug, and respective annular fiber structures for making rings that are formed inside the empty spaces provided between the core and the belt.

FIGS. 3A to 3C show various steps of obtaining such fiber reinforcement, in a first embodiment of the invention.

In this first embodiment, the peripheral fiber structure for making the belt is obtained by three-dimensionally weaving a fiber blank as shown in FIG. 3A. This fiber blank is in the form of a strip 100 having a plurality of layers of warp yarns extending in the length direction of the strip and interlinked by weft yarns (the warp and weft directions being shown in FIG. 3A).

Openings 102 of oblong shape are made in the strip, being oriented in the length direction, and passing through the strip in the thickness direction. By way of example, such openings are made by cutting with a water jet. The resulting strip 100 is then looped as shown by arrows F (FIG. 3B) so as to join together the free ends 104 and form a loop. These ends 104 are then joined together, e.g. by stitching, by adhesive, or by any other appropriate technique.

Once the strip 100 has been looped, the peripheral structure 16 shown in FIG. 3B is obtained with the openings 102 situated at opposite ends of the loop. Reference may be made to document EP 1 736 674, which describes making such a peripheral structure.

In a variant embodiment, not shown, the peripheral structure could be obtained by winding a plurality of turns of a single fiber strip so as to form a loop like that shown in FIG. 3B.

The central fiber structure 106 for forming the core of the part is obtained by three-dimensionally weaving the fiber blank shown in FIG. 3C. This fiber blank in the form of a single piece is in the form of a beam of constant section, e.g. H-shaped (or of some other shape, e.g. O-shaped, or S-shaped, etc.), with two longitudinal portions (or flanges) 108 connected together by a transverse portion (or web) 110.

At each of their ends, the two longitudinal portions 108 of the central structure are terminated by respective annular structures 112, each having an orifice 114. The annular structures are to form rings of composite material for passing a pin of a pivot connection. In this example, the annular structures 112 and the central structure 106 form a single fiber structure that is obtained by three-dimensional weaving.

Once the peripheral fiber structure 16 and the central fiber structure 106 have been made and shaped as described above, they are engaged one within the other by positioning the peripheral structure around the central structure. In particular, in this position, the peripheral structure 16 co-operates with the central structure 106 at their ends to form cylindrical spaces that are occupied by the annular structures 112. The structures are then assembled together by stitching, by adhesive, or by any other appropriate technique.

This produces fiber reinforcement that becomes the part 10 shown in FIG. 2, after being densified with a matrix. In particular, in the lugs 14, this fiber reinforcement has rings (formed by the annular structures 112 of the central structure) made of composite material, thus making it possible significantly to counter failure in response to hammering forces on the part.

Figure 4A:
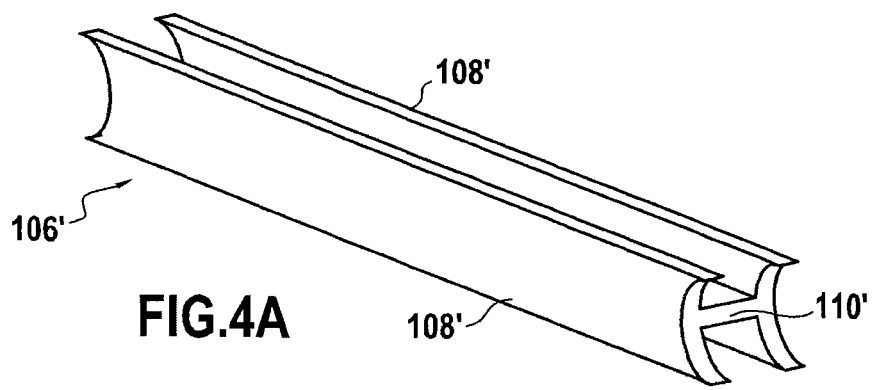
FIGS. 4A and 4B show different steps in obtaining the FIG. 2 mechanical part in another embodiment of the invention.
Figure 4B:
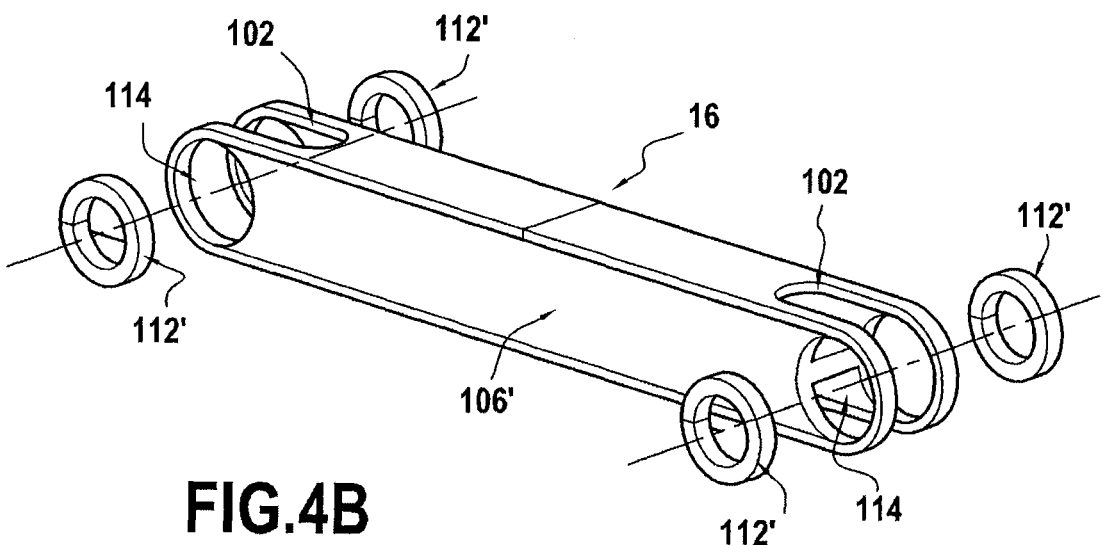

FIGS. 4A and 4B show various steps of obtaining the same fiber reinforcement, in a second embodiment of the invention.

This second embodiment differs from the above-described embodiment in that the annular structures for forming the rings in the cavities of the part are structures that are distinct from the central structure and from the peripheral structure.

The central structure for forming the core of the part is obtained by three-dimensionally weaving the fiber blank 106' shown in FIG. 4A. This fiber blank is similar to that shown in FIG. 3B, in particular in that it is in the form of a beam of constant section, e.g. H-shaped (or of some other shape, e.g. O-shaped, or S-shaped, etc.), with two longitudinal portions (or flanges) 108' connected together by a transverse portion (or web) 110'. Unlike the first embodiment, at its longitudinal ends, this beam does not have annular structures that are to form the rings. Reference may be made to document EP 1 736 674, which describes making such a central structure.

The peripheral fiber structure 16 is identical to that shown in FIG. 3A, i.e. it is obtained by three-dimensionally weaving a fiber blank in the form of a strip in which openings 102 are formed and that is looped so as to form a loop (see FIG. 4B).

The annular structures 112' for forming the rings for passing a pivot connection pin are shown in FIG. 4B. Each of them may be obtained by three-dimensionally weaving a fiber blank in the form of a strip that is then looped to form a ring.

Under such circumstances, the fiber blank of each annular structure 112' comprises a plurality of layers of warp yarns extending in the length direction of the strip and interlinked by weft yarns. Once looped in the form of a ring, the warp yarns thus extend in a circumferential direction, while the weft yarns extend in the thickness direction of the ring.

Alternatively, the annular structures 112' may each be obtained by braiding.

Once the peripheral structure 16, the central structure 106', and the annular structures 112' have all been made and shaped as described above, they are engaged within one another by positioning the peripheral structure around the central structure. In particular, in this position, the peripheral structure 16 co-operates with the central structure 106' at their ends to form cylindrical spaces 114 in which the annular structures 112' are positioned. The structures are then assembled together by stitching, by adhesive, or by any other appropriate technique.

This produces fiber reinforcement that becomes the part 10 shown in FIG. 2, after being densified with a matrix.

Figure 5A:
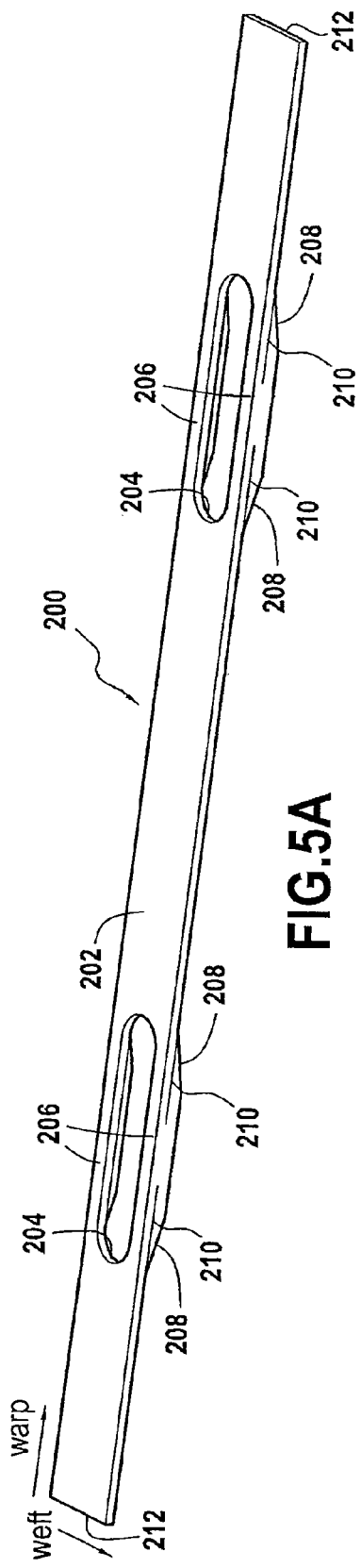
FIGS. 5A to 5C show different steps in obtaining the FIG. 2 mechanical part in yet another embodiment of the invention.
Figure 5B:
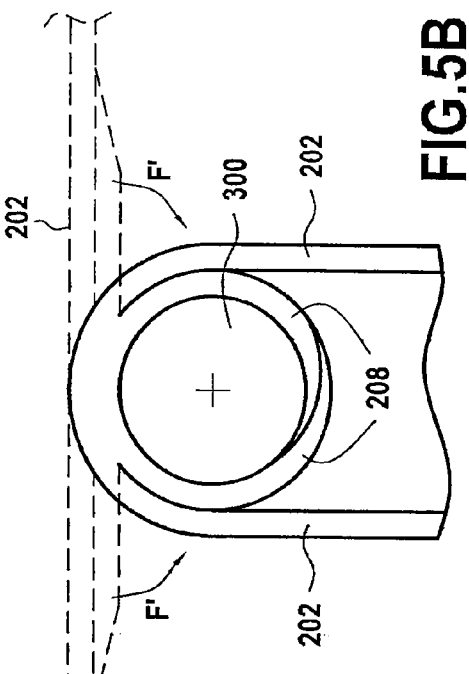
Figure 5C:
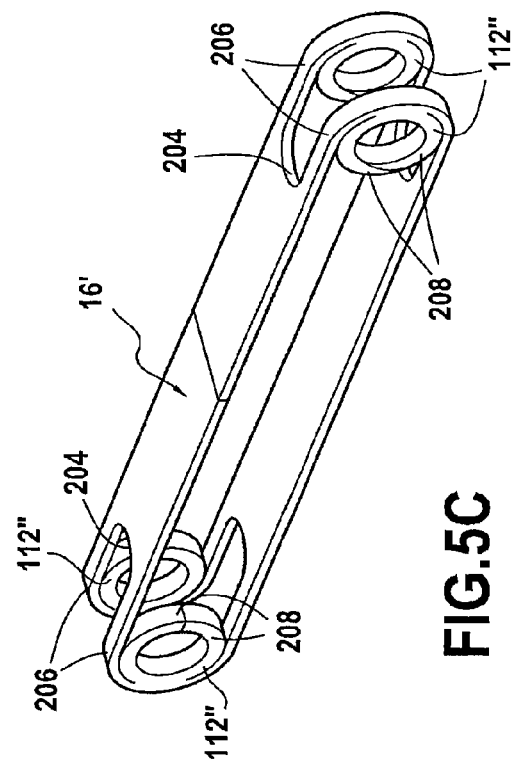

FIGS. 5A to 5C show various steps of obtaining the same fiber reinforcement, in a third embodiment of the invention.

In this third embodiment, the annular structures for forming the rings in the lugs of the part form an integral portion of the peripheral structure for making the core of the part.

More precisely, the peripheral fiber structure and the two annular structures are obtained by three-dimensionally weaving the fiber blank 200 as a single piece shown in Figure 5A.

This fiber blank 200 comprises a main portion in the form of a strip 202 that extends in a direction corresponding to the longitudinal direction of the core to be fabricated. Openings 204 of oblong shape are made in the strip, being oriented in the length direction, and passing through the strip in the thickness direction.

Furthermore, in the portions of the strip 206 bordering each opening 204, the fiber blank also has two secondary portions 208, each connected to the strip 202 by a zone 210 of non-interlinking and forming longitudinal tongues.

This fiber blank 200 is made as a single piece by three-dimensional weaving a plurality of layers of warp yarns that extend in the length direction of the strip 202 and that are interlinked by weft yarns. The warp and weft directions are shown in FIG. 5A.

The strip 202 with the tongues 208 is then looped as shown by arrows F' so as to join together the free ends 212 and form a loop. These ends 212 are then joined together and optionally reinforced by stitching, by adhesive, or by any other appropriate technique.

During this operation, the tongues 208 of the fiber blank are folded towards each other around a tool 300 suitable for forming two annular structures 112" at each opening 204 (FIG. 5B). In particular, the free ends of these tongues are assembled together by stitching, by adhesive, or by any other appropriate technique.

Once rolled up in the form of annular structures 112", the warp yarns of the tongues 208 thus extend in a circumferential direction, while the weft yarns extend in the thickness direction of the rings.

In the example shown in FIGS. 5A to 5C, each of the two tongues 208 of the fiber blank presents a portion that is truncated in the longitudinal direction so as to enable the tongues to overlap in part when they are folded towards each other. This overlap zone between the tongues 208 may be extended by varying the regressivity of the slopes that is selected and adapted to the constraints on dimensioning.

Naturally, it is possible for the free ends of the tongues of the fiber blank of the peripheral portion not to overlap and instead to meet edge to edge. Under such circumstances, these free ends are also assembled together by any appropriate technique.

After such shaping, the peripheral structure 16' as shown in FIG. 5C is obtained with the openings 204 situated at opposite ends of the loop and two rings formed by the tongues 208 in the portions of the strip 206 bordering each of the openings 204.

The central structure 106' that is to form the core of the part is identical to the central structure shown in FIG. 4A, specifically it is obtained by three-dimensional weaving and it is in the form of a beam of constant section, e.g. H-shaped (or of some other shape, e.g. O-shaped, or S-shaped, etc.), with two longitudinal portions (or flanges) 108' connected together by a transverse portion (or web) 110'.

Once the peripheral structure 16' and the central structure 106' have been made and shaped as described above, they are engaged one within the other by positioning the peripheral structure around the central structure. In particular, in this position, the peripheral structure 16' co-operates with the central structure 106' at their ends to form cylindrical spaces in which the rings formed by the annular structures 112" of the peripheral structure are positioned. The structures are then assembled together by stitching, by adhesive, or by any other appropriate technique.

This produces fiber reinforcement that becomes the part 10 shown in FIG. 2, after being densified with a matrix.

The invention claimed is:

1. A fiber reinforcement for making an elongate mechanical part out of composite material having at least one lug at least one end of the part for a purpose of receiving a pin in order to make a pivot connection with another part, the fiber reinforcement comprising:
    a central fiber structure to form a core that is obtained by three-dimensional weaving;
    a peripheral fiber structure to form a belt that surrounds the central structure so as to arrange at least one empty cylindrical space at the lug; and
    at least one annular fiber structure to form a ring that is formed inside the empty space arranged between the central structure and the peripheral structure;
    wherein the peripheral structure and the annular structure form a single structure and are obtained by three-dimensionally weaving a fiber blank as a single piece with:
        a main portion in the form of a strip that extends in a direction corresponding to a longitudinal direction of the core to be fabricated; and
        two secondary portions, each connected to the main portion, and the two secondary portions including a zone of non-interlinking in order to form two longitudinal tongues that are foldable towards each other in order to form the ring.

2. The fiber reinforcement according to claim 1, wherein each of the two tongues of the fiber blank presents a portion that is truncated in the longitudinal direction so as to enable the tongues to overlap when they are folded towards each other.

3. The fiber reinforcement according to claim 1, wherein the fiber blank of the peripheral structure and of the annular structure comprises a plurality of layers of warp yarns extending in a length direction of the strip and of the tongues and interlinked with one another by weft yarns.

4. An elongate mechanical part made of composite material comprising the fiber reinforcement according to claim 1 that is densified by a matrix.

5. The mechanical part according to claim 4, wherein the mechanical part constitutes a lever of a side-brace for a landing gear.

\* \* \* \* \*